Patented June 1, 1954

2,680,131

UNITED STATES PATENT OFFICE 2,680,131

TRANS VINYLENE DIISOCYANATE AND METHOD OF PREPARATION

Marvin H. Gold, Pasadena, Calif., assignor, by mesne assignments, to Aerojet-General Corporation, Cincinnati, Ohio, a corporation of Ohio No Drawing. Application July 29, 1952, Serial No. 301,613

4 Claims. (Cl. 260—453)

This invention relates to a new composition of matter and a method for making it and in particular to a new unsaturated diisocyanate.

The object of this invention is to prepare trans vinylene diisocyanate which is a valuable intermediate and can also be used for the formation of resinous materials by reaction with glycols and diamines to form polyurethanes and polyureas.

A further object of this invention is to provide a new monomer for polyurethanes and polyureas which is capable of vulcanization or cross-linking due to the unsaturation in the monomer unit.

A further object of the invention is to provide a process for the synthesis of the unsaturated diisocyanate, trans vinylene diisocyanate. Heretofore the unsaturated diisocyanate trans vinylene diisocyanate has been unknown.

According to my invention I have succeeded in making a new compound, trans vinylene diisocyanate by employing fumaryl diazide as a starting material and treating it by the novel process which is disclosed herein.

Fumaryl diazide can be prepared in the following manner: This portion of the process is not a part of this invention. The dimethyl or similar esters of fumaric acid are treated with hydrazine in the form of hydrazine hydrate thereby forming the fumaryl hydrazide. This product is then treated with nitrous acid and fumaryl diazide is formed with accompanying elimination of water. The fumaryl diazide is usually prepared and kept in solution because the dry crystalline fumaryl diazide is extremely sensitive towards impact.

The preparation of trans vinylene diisocyanate according to my invention is as follows: Fumaryl diazide in solution, preferably an ether solution which contains approximately 50 gms. of fumaryl diazide is thoroughly dried over a drying agent such as calcium sulfate and then the solution is added to 1500 ml. of an inert high boiling solvent such as dibutyl sebacate and placed in 5,000 ml. distilling flask. The ether in which the fumaryl diazide was originally dissolved is removed by distillation by employing reduced pressure as provided by a water aspirator. This leaves the diazide in a dibutyl sebacate solution which is an inert solvent. The flask is then connected to a distillation unit and a Dry Ice bath is employed surrounding the receiver to condense the distillate. The pressure in the system at which the distillation is conducted varies from 1 to 10 mm. and a preferred pressure is approximately 5 mm. The temperature of the sebacate solution of fumaryl diazide is allowed to slowly raise to about 80 to 90° C. at which point a rapid evolution of nitrogen takes place accompanied by the distillation of the trans vinylene diisocyanate.

A crude product is obtained in this manner, which is solid having a melting point between 45° C. and 65° C. and is produced in about 50% yield. Vacuum sublimation is employed to purify the product and the resulting purified trans vinylene diisocyanate has a melting point from 67° to 69° C. Micro distillation of the purified product shows a boiling point of 150±5° C. at 750 mm. The identity of the purified product was further confirmed by converting the trans vinylene diisocyanate to the diethyl urethane which is a well known compound and has a definite melting point which is between 218° and 220° C.

According to my invention any inert solvent may be used in place of ether for dissolving the diazide. The only requirement is that the solvent will not react with the hydrazine or the resulting fumaryl diazide. Thus, solvents which are operable in this invention may include ether, paraffin hydrocarbons, aromatic hydrocarbons, chlorinated hydrocarbons.

Any inert high boiling solvent may be used in place of the dibutyl sebacate such as the esters, dioctyl sebacate, dihexyl sebacate, dicyclohexyl sebacate, dibenzyl sebacate, tricresyl phosphate, trioctyl phosphate, dibutyl phthalate, dihexyl phthalate, dioctyl phthalate. In addition to esters other types of compounds such as high boiling ethers, nitriles, ketones, and combinations containing two or more of such functional groups may also be used.

Also it is within the scope of my invention that the initial solvent such as ether be substituted by a high boiling inert solvent so that the entire process may be carried out without the necessity for subsequent removal of a volatile solvent.

The reactions involved in this process are clearly set forth in the following equations.

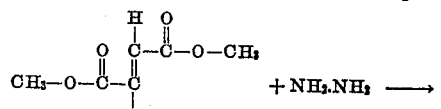

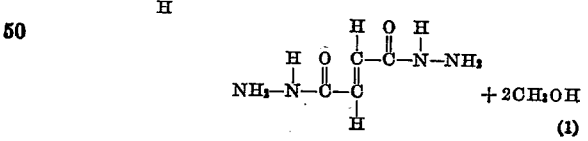

(1)

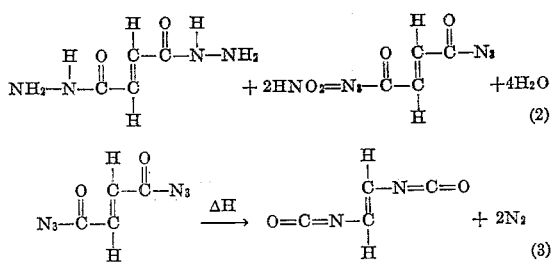

The unsaturated diisocyanate will react according to my invention with either glycols or diamines to form polyurethanes or polyureas respectively. These polymers are thermo-setting resins due to the cross-linking which may take place through the double bond during the linear polymerization or by vulcanization at an elevated temperature after the initial linear polymerization is complete.

I claim:

1. A new composition of matter trans vinylene diisocyanate having the formula:

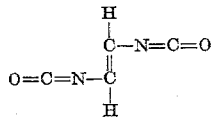

2. A method of forming trans vinylene diisocyanate which comprises dissolving fumaryl diazide in a high boiling inert solvent, placing the solution fumaryl diazide in the solvent in a distilling system, reducing the pressure in the system to from 1 to 10 mm. absolute pressure, slowly raising the temperature of the fumaryl diazide solution to between 80° and 90° C. evolving nitrogen from the solution and simultaneously distilling trans vinylene diisocyanate, recovering the distillate by passing the distillation products into a condensing means surrounded by a Dry Ice bath.

3. A method of forming trans vinylene diisocyanate which comprises dissolving fumaryl diazide in a volatile solvent which is inert to fumaryl diazide and hydrazine, adding to the volatile solvent solution of fumaryl diazide a high boiling inert solvent, removing the volatile solvent by distillation at reduced pressures, placing the solution of the fumaryl diazide in the high boiling solvent in a distilling system, reducing the pressure in the system to from 1 to 10 mm. pressure absolute, slowly raising the temperature of the fumaryl diazide solution to between 80° and 90° C. evolving nitrogen from the solution and simultaneously distilling trans vinylene diisocyanate, recovering the distillate by passing the distillation products into a condensing means surrounded by a Dry Ice bath.

4. The process of claim 3 in which dibutyl sebacate is utilized as the high boiling inert solvent.

References Cited in the file of this patent

UNITED STATES PATENTS

| Number | Name | Date |
|---|---|---|
| 2,303,364 | Schrim | Dec. 1, 1942 |
| 2,334,476 | Coffman | Nov. 16, 1943 |
| 2,514,328 | Jones | July 4, 1950 |
| 2,544,709 | Mason | Mar. 13, 1951 |